March 12, 1968 D. L. TEUBER 3,373,327
CONTROL CIRCUIT FOR CRYOGENIC MOTORS
Filed Sept. 22, 1964 2 Sheets-Sheet 1

Dieter L. Teuber,
INVENTOR.

BY Harry M. Saragovitz
Edward J. Kelly
Herbert Berl
Jack W. Voigt
ATTORNEYS

Dieter L. Teuber,
INVENTOR.

United States Patent Office 3,373,327
Patented Mar. 12, 1968

3,373,327
CONTROL CIRCUIT FOR CRYOGENIC MOTORS
Dieter L. Teuber, Huntsville, Ala., assignor to the United States of America as represented by the Secretary of the Army
Filed Sept. 22, 1964, Ser. No. 398,461
8 Claims. (Cl. 318—138)

The invention described herein may be manufactured and used by or for the Government for governmental purposes without the payment of any royalty thereon.

This invention relates generally to control of a cryogenic motor. More particularly the present invention relates to a cryogenic motor having a pick-up coil which causes operation of a control system for a torquer coil of the motor.

A problem of how to supply the torquer coils of a cryogenic motor with current at the proper time and in the proper sequence is one that must be solved in this field. The use of commutators or other movable switching devices have several serious drawbacks. They will present a load to the motor due to friction, and they will add more weight and additional size to the motor. The time at which one should supply current to the torquer coil of a cryogenic motor is different from conventional motors not having a superconductor rotor. In a cryogenic motor the torquer coil is supplied with current from the rotor tooth position to the middle of the gap between rotor teeth. Whereas, in an induction motor the coil is supplied with current from the middle of the gap between rotor teeth to a tooth position. This makes it necessary to have new and different circuitry in a cryogenic motor control circuitry.

Accordingly, it is an object of this invention to provide a control system suitable for use in a cryogenic motor.

A further object of the present invention is to provide a control system which will cause correct sequential actuation of the torquer coils of a motor.

A still further object of this invention is to provide a motor which will operate in a space vehicle or the like that is subject to extreme cold.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention, and in which:

Figure 1:
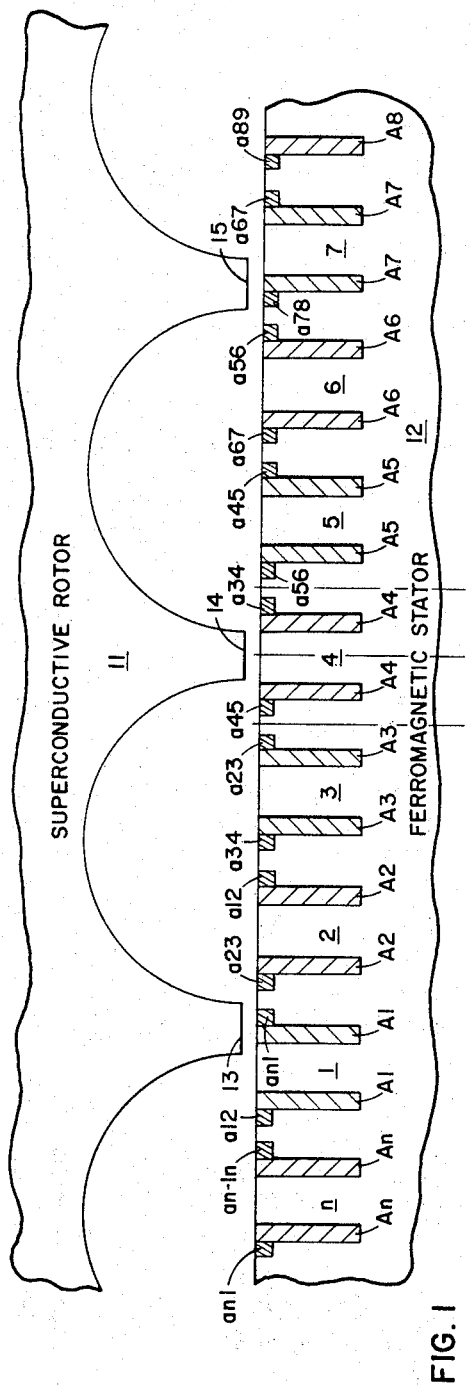
FIGURE 1 illustrates a preferred coil arrangement and preferred rotor shape of the present invention.

In order to better understand the operation of the system described in the figures, a description of their components referred to is first presented. FIGURE 1 shows a superconductive rotor 11 and a ferromagnetic stator 12. These are shown as being lineal for illustration purposes but the preferred embodiment device itself will be circular with the stator inclosing the rotor. However, the invention will operate as a lineal motor. The rotor 11 is made of a superconductive material such as niobium, and has teeth 13, 14, 15, etc. Torquer coils $Al$–$An$ may be made of special superconductive material and operated in a superconductive state.

The stator 12 is made out of a ferromagnetic material such as iron. Said stator has teeth 1 through $n$. Torquer coils $Al$ through $An$ are wound around teeth 1 through $n$ respectively. The stator, further, has control coils $a12$ through $an1$. Coil $a12$ is wound around teeth 1 and 2; coil $a23$ is wound around teeth 2 and 3; coil $a34$ is wound around teeth 3 and 4; etc.

Figure 2:
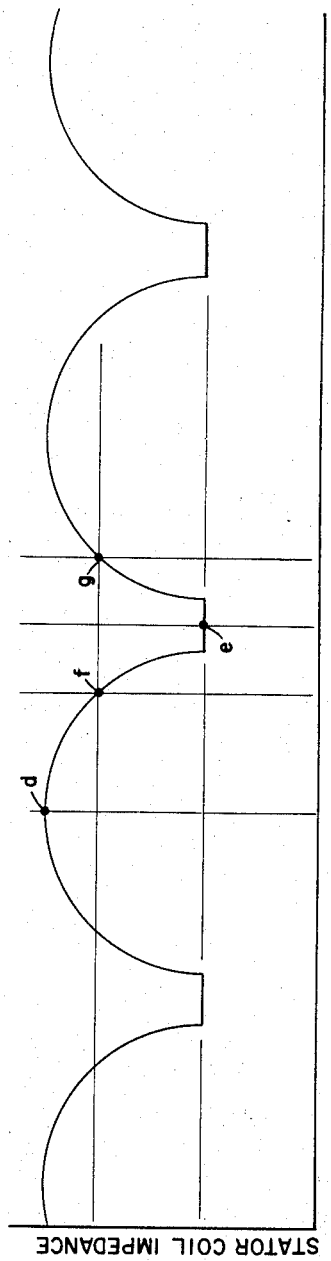
FIGURE 2 illustrates the relationship of the impedance of a control coil or a torquer coil placed in the different positions with respect to the rotor.

Coil $a12$ has its center about the slot (it should be noted that the slot of a cryogenic motor is not an air gap as in ordinary motors but contains ferromagnetic material) between teeth 1 and 2; coil $a23$ has its center about the slot between teeth 2 and 3; etc., and it is with respect to these centers that the plot of FIGURE 2 was derived. Point $e$ of FIGURE 2 shows that the impedances of a control coil is at a minimum when its center is over a tooth of the rotor. Point $d$ indicates that the impedances of a control coil is at a maximum when its center is located half way between two teeth of the rotor. Points $f$ and $g$ show the impedance of coils $a34$ and $a45$ in their positions as shown in FIGURE 1.

Figure 3:
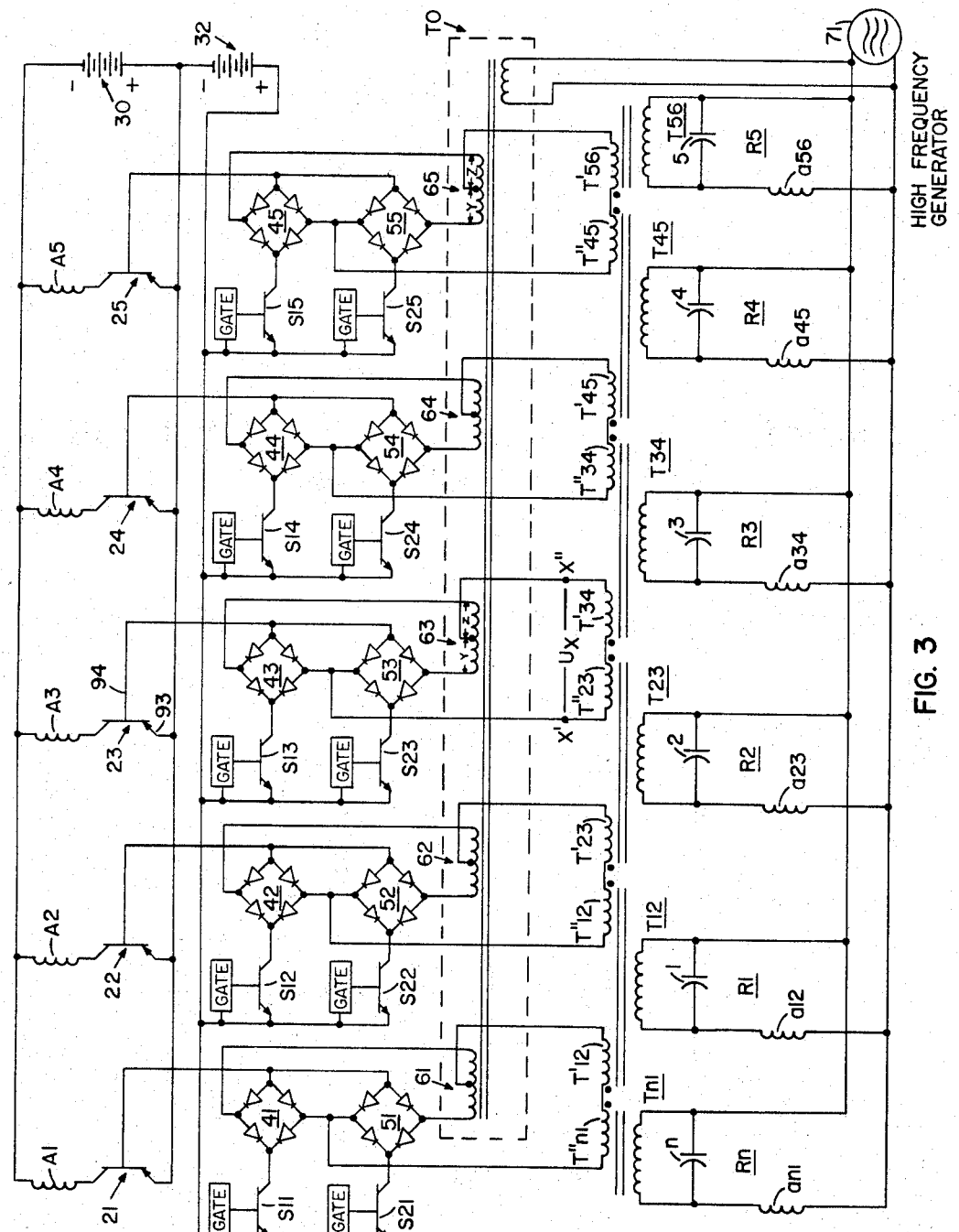
FIGURE 3 shows a schematic diagram illustrating a preferred form of the invention.

FIGURE 3 shows torquer coils $A1$ through $A5$ each connected in series with one of the power transistors 21 through 25 respectively. Torquer coils $A6$ through $An$ are connected to other power transistors in a similar manner. The number of torquer coils desired is a matter of design insofar as this invention is concerned. However, it is preferred that the number of torquer coils (and therefore, the number of teeth of the stator) be something other than an integral multiple per rotor tooth (such as 1¼, 1½, etc.). This is done so as to give a smoother torque output, and so that only a small number of the power transistors will be switched on or off at the same time.

A power battery 30 is connected to supply all the torquer coils and the power transistors. A battery 32 is connected to provide a bias voltage for the base electrode circuits of the power transistors. The center tapped secondaries of phase sensitive transformer T0 (beginning with secondary winding 61) combine with secondary windings T′12 through T″$n1$ to form inputs for the pairs rectifiers (beginning with 41 and 51). The outputs of these rectifiers are connected to the base circuits of the power transistors by way of switching transistors (beginning with S11 and S21).

The primary windings of transformers T12 through T$n1$ are connected to a high frequency generator 71 by way of resonant circuits R1 through R$n$. The primary winding of the phase sensitive transformer T0 is also connected to high frequency generator 71.

Overall operation of the motor

In any electric motor the torquer coil when energized will tend to move the rotor to a position which allows maximum magnetic energy in the magnetic field of that coil. This would be the case in a cryogenic motor when the gap between two rotor teeth is centered relative to the energized coil. In order to generate a torque in only one direction, the torquer coils have to be activated intermittently. The periods of activation are characterized by increasing magnetic field energy (that in turn means increasing inductivity) of the torquer coils in the direction of rotation.

In a cryogenic motor, no magnetic flux penetrates into its superconductive rotor (or only into an extremely thin layer of it). Since the space available for the magnetic field of torquer A4 which is directly under a tooth 14 of the rotor is smaller than that available for coil A3; torquer coil A3 has a greater inductively than coil A4. In the same manner control coil $a23$ has a greater inductivity than control coil $a34$. This is so because the two control coils detect their inductivity in different positions of the rotor.

From the above it can be seen that the inductivity of torquer coil A3 will increase with rotatoin of the rotor to the right as seen in FIGURE 1, and will decrease with rotation to the left. Increased inductivity means increased magnetic energy; therefore since increasing magnetic energy produces a torque, energizing torquer coil A3 will cause rotor 11 to rotate to the right: If a rotation of the rotor to the left was desired torquer coil A3 would not be energized but torquer coils A2, A5, and A7 would be energized. It may be noted that torquer coil A4 being in position of minimum inductivity will be energized upon a movement to the right or the left by the rotor.

The control coils $a35$ and $a45$ associated with torquer coil A4 have the same amount of impedance in the positions shown in FIGURE 1. This is shown clearly by points $f$ and $g$ on the graph of FIGURE 2. If the rotor is moved to the left, coil $a34$ will decrease its inductivity while coil $a45$ will increase its inductivity; therefore coil $a45$ will have more impedance than coil $a34$. This condition will continue until torquer coil A4 is centered between rotor teeth 14 and 15. Then the impedance of the two control coils will again be equal. As the rotor continues to the left, control coil $a34$ will have more impedance I34, than the impedance I45 of control coil $a45$. This condition will continue until torquer coil A4 is directly in line with rotor tooth 15. The cycle will now be repeated. Generally, it can be stated that if the difference of inductance of coil $a34$ minus the inductance of coil $a45$ (I34–I45) is larger than zero then the rotor tends to move to the left if the torque coil A4 is energized. The rotor tends to move to the right if I34–I45 is smaller than zero. Thus, if torque in a particular direction is desired, the sign of the difference in impedance of the two control coils next to the torquer coil decides whether the torquer coil is to be energized or not.

Operation of control circuitry

FIGURE 3 shows a preferred circuit for converting the signals of the control coils (i.e. the change of their inductances) into signals to control power transistors (beginning with 21), and therefore the energization of torquer coils A1 through A$n$. As an example the signal flow to power transistor 23 is considered. The associated control coils $a23$ and $a34$ are connected in series with capacitors 2 and 3 respectively to form resonant circuits R2 and R3. Both resonant circuits R2 and R3 are tuned to a frequency close to, but not the same as, the frequency of the high frequency generator 71. The voltages across the capacitors will, therefore, change about linearly with the detected inductance of the control coils.

Because of the back to back connection of adjacent secondary windings T″23 and T′34, the voltage U$x$ between the points X′ and X″ is proportional in voltage to the difference between the impedance of coil $a23$ minus the impedance of coil $a34$ (I23–I34). This difference is, of course, proportional to the impedance of torquer coil A3. A change of sign of said difference causes a phase shift of 180° in the voltage U$x$. The secondary winding 63 of transformer TO adds its voltage Y to U$x$ with respect to rectifier 53 and adds the voltage Z to U$x$ with respect to rectifier 43. The voltage Y is either near in phase with U$x$ or near 180° out of phase with U$x$ depending on the sign of (I23–I34). If U$x$ is in phase with Y, the two voltages add up and the D.C. output voltage at rectifier 53 is high. In this case the voltage Z is nearly 180° out of phase with respect to U$x$; therefore the output voltage at rectifier 43 is low. If I23–I34 changes sign, the phase of U$x$ changes 180° (the only possible phase shift). This causes the output voltage of bridge rectifier 53 to change to a low level and the output of bridge rectifier 43 will change to a high level.

If torque in only one direction is desired (arbitrarily called a forward direction) all the gate circuits of the switching transistors (beginning with S11) are gating these transistors off; while the gating circuits of switching transistors (beginning with S21) are gating these transistors to the on condition. This in effect disconnects the output of rectifiers (beginning with 41) from the power transistors. If the output voltage at rectifier 53 is high, a current flows through switching transistor S23, backwards through bias battery 32, through emitter electrode 93, and out of the base electrode 94 back to bridge rectifier 53. When the output voltage at 53 changes to a low level due to change in the sign of I23–I34, no current will flow through the base electrode 94 of power transistor 23. This is so because the voltage of bias battery 32 is too high. Therefore, the power transistor 23 is cut off and A3 is not energized. Thus the torquer coil A3 is energized only, if the difference of the control coil's impedance is of one particular sign. As discussed above this leads to torque in one direction only. The circuits to the other torquer coils operate in the same manner.

If torque in the opposite direction (backward direction) is desired, all the gates of switching transistors (beginning with S11) are set to turn these transistors on; while the gates of the switching transistors (beginning with S21) are set to turn these transistors off. This shuts off rectifier 53 from the base circuit. If the output voltage at 43 is high, a current flows through transistor S13, backwards through bias battery 32, through the emitter 93, and through base electrode 94 back to rectifier 43. Torquer coil A3 is therefore energized. Obviously, A3 will not be energized if the output of rectifier 43 drops to a low level as discussed above. Thus there will be a torque in the backward direction.

Applications

This pickup and control system could be used in a spherical shaped cryogenic motor planned for an attitude control system of a satellite or space probe and for cryogenic gyros. For cryogenic motors with cylindrically shaped rotors, one pair of control coils can control a group of torquer coils. In this case the rotor spacing has to be an integral multiple of the torquer coil spacing. The windings of the torquer coils can be made of superconducting material and operate in a superconducting condition as does the rotor.

While in accordance with the provisions of the statutes, I have illustrated and described the best forms of the invention now known to me, it will be apparent to those skilled in the art that changes may be made in form of the apparatus disclosed without departing from the spirit of the invention as set forth in the appended claims, and that in some cases certain features of the invention may sometimes be used to advantage without a corresponding use of other features. Accordingly, I desire the scope of my invention to be limited only by the appended claims.

I claim:
1. A motor comprising a plurality of coil means; a rotor mounted for rotation; first circuit means for sensing the direction of change in the inductivity of each coil means due to rotation of said rotor; said first circuit means having a plurality of control windings, each wound around and associated with different pairs of adjacent coil means; said control windings being so arranged that a difference in inductivity of any two control windings associated with one of said coil means is proportional to the inductivity of said one coil means, control circuit means having inputs connected to outputs of said first circuit means; and said control circuit means having outputs connected to the coil means so as to control the energization of said coil means.

2. A motor as set forth in claim 1, wherein said control means is constructed so as to cause energization of each coil means only when said first circuit means senses an increasing inductivity of the coil means.

3. A motor as set forth in claim 1, further comprising a stator; and said coil means and said windings being mounted in said stator.

4. A motor as set forth in claim 3, wherein said motor is a cryogenic motor in which the rotor is made of a superconductive material and is operated at a temperature which causes it to stay in a superconductive state.

5. A motor as set forth in claim 3, wherein said first circuit means consist of a plurality of first transformers each having a primary winding and two secondary windings; a source of high frequency voltage; a plurality of capacitors connected with said primary windings so as to form a plurality of parallel circuits each consisting of a single capacitor connected in parallel with a single primary winding; means connecting said high frequency voltage, said control windings, and said parallel circuits into a plurality of series circuits; and means connecting one of the secondary windings of a first transformer in series with one of the secondary winding of an adjacent transformer so as to form a difference network having first and second output terminals; means connecting the other secondary windings in like manner so as to present a plurality of difference networks each having first and second output terminals; a plurality of phase detecting means connected to the output terminals of said difference networks; and said phase detecting means having outputs which are connected to said control circuit means.

6. A motor as set forth in claim 5, wherein said phase detecting means comprise a second transformer having a plurality of center tapped secondary windings and a common primary winding; said primary winding being connected to said source of high frequency voltage; each of said center tapped secondary windings having their tap connected to the first terminal of one of said difference networks, and having their ends connected across one pair of a plurality of pairs of series connected bridge rectifier means; said second terminal of the difference networks being connected to a junction between said rectifier means; and said bridge rectifier means having outputs which are connected to said control circuit means.

7. A motor as set forth in claim 6, wherein said control circuit means comprises a plurality of transistors each connected in series with different coil means and a single source of D.C. voltage; a plurality of series networks consisting of one control circuit of said transistors, one of the pair of rectifier means and a first one of a plurality of pairs of switch means; a further plurality of series networks consisting of one control circuit of said transistors, another of the pair of rectifiers means and another one of the plurality of pairs of switch means; and a bias voltage means connected across all of said plurality of series networks.

8. A motor as set forth in claim 7, wherein said pair of switch means are each a transistor; and where one set of switch means may be gated on while the other set of switch means is gated off.

References Cited
UNITED STATES PATENTS

| | | |
|---|---|---|
| 3,005,117 | 10/1961 | Buchhold. |
| 3,091,728 | 5/1963 | Hogan et al. _____ 318—138 |
| 3,242,418 | 3/1966 | Mele et al. _____ 310—52 X |
| 3,264,539 | 8/1966 | Sander _____ 318—138 |
| 3,274,471 | 9/1966 | Moczala _____ 318—138 |
| 3,304,480 | 2/1967 | Ko _____ 318—138 |
| 3,304,481 | 2/1967 | Saussele _____ 318—138 |
| 2,867,762 | 1/1959 | Lehman et al. _____ 318—254 |
| 3,091,728 | 5/1963 | Hogan et al. _____ 318—254 X |
| 3,127,548 | 3/1964 | Van Emden _____ 318—254 |
| 3,153,185 | 10/1964 | Hummel _____ 318—254 |
| 3,214,663 | 10/1965 | Kreutzer _____ 318—138 |

ORIS L. RADER, *Primary Examiner.*

G. R. SIMMONS, *Assistant Examiner.*